United States Patent
Mickle et al.

(10) Patent No.: US 7,528,698 B2
(45) Date of Patent: May 5, 2009

(54) MULTIPLE ANTENNA ENERGY HARVESTING

(75) Inventors: Marlin H. Mickle, Pittsburgh, PA (US); Minhong Mi, Sewickley, PA (US); Leonid Mats, Pittsburgh, PA (US)

(73) Assignee: University of Pittsburgh-Of the Commonwealth System of Higher Education, Pittsburgh, PA (US)

( * ) Notice: Subject to any disclaimer, the term of this patent is extended or adjusted under 35 U.S.C. 154(b) by 117 days.

(21) Appl. No.: 11/619,786

(22) Filed: Jan. 4, 2007

(65) Prior Publication Data

US 2007/0153561 A1 Jul. 5, 2007

Related U.S. Application Data

(60) Provisional application No. 60/756,309, filed on Jan. 5, 2006.

(51) Int. Cl.
*H04Q 5/22* (2006.01)
(52) U.S. Cl. .................. 340/10.34; 340/10.33; 320/101; 320/104; 343/701; 343/703
(58) Field of Classification Search .............. 340/10.33, 340/10.34, 572.1; 455/343.2; 343/701, 703, 343/850, 853; 320/104, 108, 109, 101
See application file for complete search history.

(56) References Cited

U.S. PATENT DOCUMENTS

| | | | |
|---|---|---|---|
| 4,724,427 A | 2/1988 | Carroll | |
| 4,857,893 A | 8/1989 | Carroll | |
| 5,111,213 A | 5/1992 | Jahoda et al. | |
| 5,296,866 A | 3/1994 | Sutton | |
| 6,127,799 A | 10/2000 | Krishnan | |
| 6,289,237 B1 | 9/2001 | Mickle et al. | |
| 6,373,447 B1 | 4/2002 | Rostoker et al. | |
| 6,615,074 B2 | 9/2003 | Mickle et al. | |
| 6,734,797 B2 | 5/2004 | Shanks et al. | |
| 6,847,844 B2 | 1/2005 | Sun et al. | |
| 6,856,291 B2 * | 2/2005 | Mickle et al. | ............... 343/701 |
| 7,057,514 B2 | 6/2006 | Mickle et al. | |
| 7,084,605 B2 * | 8/2006 | Mickle et al. | ............... 320/101 |

\* cited by examiner

*Primary Examiner*—Hoang V Nguyen
(74) *Attorney, Agent, or Firm*—Eckert Seamans Cherin & Mellott, LLC; Philip E. Levy (57) ABSTRACT

Energy harvesting circuits and associated methods are provided that employ multiple antennas to optimize the amount of energy that is harvested while at the same time making efficient use of tag space. In some embodiments, matching networks are chosen in a manner that optimizes the DC energy that is created from the harvesting process. In other embodiments, phase shifts are introduced into the received signals to allow the signals to be more efficiently combined after they are rectified.

32 Claims, 8 Drawing Sheets

FIG. 9 ns, wherein each of the antennas is tuned to the same particular RF frequency range. Each of the antennas is structured to receive an RF signal having the same particular RF frequency and output a respective AC signal. The circuit also includes a plurality of matching networks, wherein each of the matching networks is operatively coupled to a respective one of the antennas and is structured to receive the AC signal output by the respective one of the antennas. The circuit further includes a plurality of voltage boosting and rectifying circuits, wherein each of the voltage boosting and rectifying circuits is operatively coupled to a respective one of the matching networks and is structured to receive the AC signal received by the respective one of the matching networks and output a DC voltage signal by converting the received AC signal into the DC voltage signal. In addition, the DC voltage signals output by the voltage boosting and rectifying circuits are summed together to create a combined DC voltage signal, and the impedance of each of the matching networks is chosen in a manner so as to maximize the voltage level of the DC voltage signal that is output by the associated voltage boosting and rectifying circuit.

In another embodiment, an energy harvesting circuit, and associated method, is provided that includes a plurality of antennas provided in an antenna plane, wherein each of the antennas is tuned the same particular RF frequency range. Each of the antennas is structured to receive an RF signal having the same particular RF frequency range and output a respective AC signal. The circuit also includes a plurality of matching networks, wherein each of the matching networks is operatively coupled to a respective one of the antennas and is structured to receive the AC signal output by the respective one of the antennas. The circuit further includes a plurality of voltage boosting and rectifying circuits, wherein each of the voltage boosting and rectifying circuits is operatively coupled to a respective one of the matching networks and is structured to receive the AC signal received by the respective one of the matching networks and output a DC voltage signal by converting the received AC signal into the DC voltage signal. In addition, the DC voltage signals output by the voltage boosting and rectifying circuits are summed together to create a combined DC voltage signal, and the impedance of each of the matching networks is chosen so as to cause a voltage level of the combined DC voltage signal to have a minimum deviation as a function of angle of rotation as the antenna plane is rotated about a first axis. Alternatively, the impedance of each of the matching networks may be chosen so as to cause a voltage level of the combined DC voltage signal to have at least a predetermined minimum value as the antenna plane is rotated about a first axis. As still a further alternative, the impedance of each of the matching networks may be chosen by: (i) incrementally rotating the antenna plane through a plurality of angle increments about a first axis, (ii) trying a plurality of different inductance and capacitance value combinations for each LC tank circuit of each of the matching networks at each of the angle increments, (iii) measuring the combined DC voltage signal for each of the inductance and capacitance value combinations at each of the angle increments, (iv) determining which one of the inductance and capacitance value combinations produces a maximum voltage level for the measured combined DC voltage signals at any one of the angle increments; (v) choosing for each the LC tank circuit the one of the inductance and capacitance value combinations that produces the maximum voltage level.

In yet another embodiment, an energy harvesting circuit, and associated method, is provided that includes a plurality of antennas, wherein each of the antennas is tuned to the same particular RF frequency range, and wherein each of the anten-

MULTIPLE ANTENNA ENERGY HARVESTING

CROSS-REFERENCE TO RELATED APPLICATION

This application claims the benefit of U.S. Provisional Application No. 60/756,309, entitled "Multiple Antenna Energy Harvesting," which was filed on Jan. 5, 2006, the disclosure of which is incorporated herein by reference.

FIELD OF THE INVENTION

The present invention relates to energy harvesting circuits for harvesting RF energy transmitted through the air and converting it to DC energy for powering electronic devices such as an RFID tag or transponder.

BACKGROUND OF THE INVENTION

The harvesting of RF energy transmitted through the air for use in powering electronic devices is extremely important in a number of fields, such as radio frequency identification (RFID) systems, security monitoring and remote sensing, among others. For example, RFID systems consist of a number of radio frequency tags or transponders (RFID tags) and one or more radio frequency readers or interrogators (RFID readers). The RFID tags typically include an integrated circuit (IC) chip, such as a complementary metal oxide semiconductor (CMOS) chip, and an antenna connected thereto for allowing the RFID tag to communicate with an RFID reader over an air interface by way of RF signals. In a typical RFID system, one or more RFID readers query the RFID tags for information stored on them, which can be, for example, identification numbers, user written data, or sensed data.

RFID tags can generally be categorized as either passive tags or active tags. Passive RFID tags do not have an internal power supply. Instead, the electrical current induced in the antenna of a passive RFID tag by the incoming RF signal from the RFID reader provides enough power for the IC chip or chips in the tag to power up and transmit a response. One passive tag technology, known as backscatter technology, generates signals by backscattering the carrier signal sent from the RFID reader. In another technology, described in U.S. Pat. Nos. 6,289,237 and 6,615,074, RF energy from the RFID reader is converted to a DC voltage by an antenna/matching circuit/charge pump combination. The DC voltage is then used to power a processor/transmitter/antenna combination that transmits information to the RFID reader at, for example, a different frequency. In either case, the area of the tag or silicon die is valuable, and therefore it is advantageous to make the most efficient use of the space thereon. In addition, it is known that multiple antennas can be used to generate a DC voltage from an RF signal. For example, U.S. Pat. No. 6,734,797 describes a tag that uses two dipole antennas where the greater of the energies produced from the two antennas is the one that is selected and used. This, however, is not the most efficient use of tag space since the energy for the "loser" antenna is not used. Thus, there is a need for an energy harvesting circuit that is able to employ multiple antennas to optimize the amount of energy that is harvested while at the same time making efficient use of tag space.

SUMMARY OF THE INVENTION

In one embodiment, an energy harvesting circuit, and associated method, is provided that includes a plurality of antennas is structured to receive an RF signal having the particular RF frequency range and output a respective AC signal. The circuit further includes phase shifting and rectifying circuitry operatively coupled to the antennas. The phase shifting and rectifying circuitry is structured to: (i) receive each respective AC signal, (ii) create a plurality of out of phase AC signals by causing each respective AC signal to be out of phase with one another, and (iii) convert each of the out of phase AC signals into a respective DC voltage signal. The DC voltage signals are then summed together to create a combined DC voltage signal.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
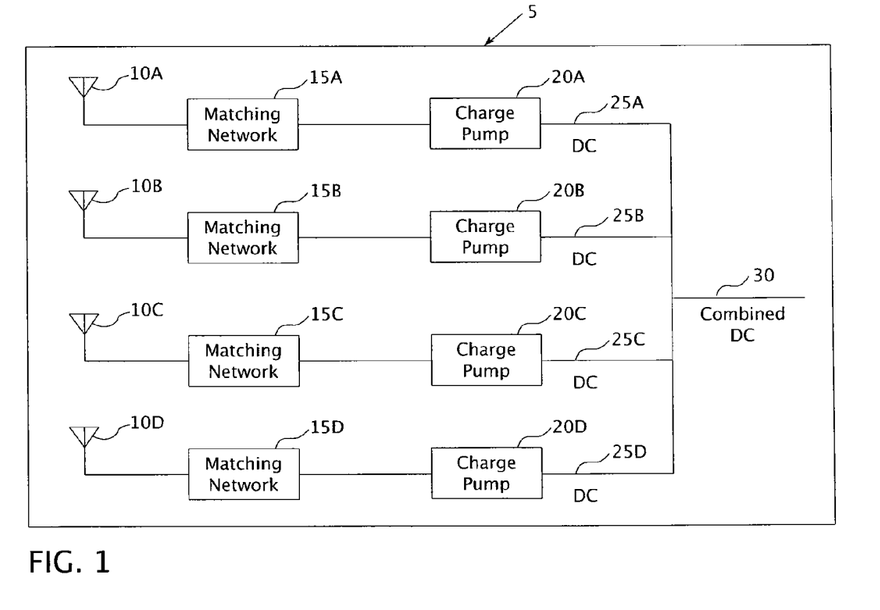
FIG. 1 is a block diagram of one embodiment of an energy harvesting circuit according to the present invention.

FIG. 1 is a block diagram of one embodiment of an energy harvesting circuit 5 according to the present invention. The energy harvesting circuit 5 may, for example, form part of an RF transponder, such as an RFID tag, for providing power thereto or form part of some other type of remote station for energizing a power storage device thereof or some other object of interest. The energy harvesting circuit 5 includes a plurality of antennas 10A-10D, each of which is tuned to the same particular RF frequency range. As used herein, the term "RF frequency range" shall refer to a single RF frequency or a band of RF frequencies. As is known, each antenna 10A-10D may have a tank circuit (not shown) that includes an inductor and a capacitor, wherein the inductance and capacitance values are chosen to tune the antenna 10A-10D to the desired RF frequency range, i.e., the same particular RF frequency or band of RF frequencies. In this embodiment, each tank circuit is fixed (i.e., fixed inductor and capacitor) so that the antenna 10A, 10B, 10C, 10D is fixedly tuned to the RF frequency range of interest.

Figure 2:
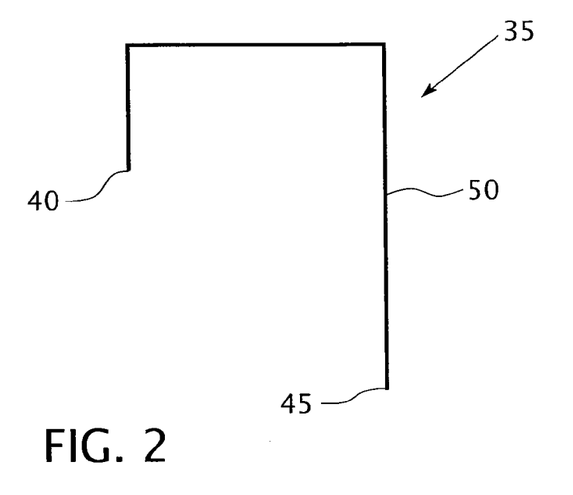
FIG. 2 is a schematic illustration of an embodiment of a square spiral antenna that may be used in the energy harvesting circuits described herein.

While four antennas 10A-10D are shown in FIG. 1, it should be understood that that is meant to be exemplary only, and that the plurality of antennas may include less than or more than four antennas (with each such antenna being operatively coupled to respective accompanying circuitry as described below). Furthermore, each antenna 10A, 10B, 10C, 10D may be, for example, a square spiral antenna 35 having the form shown in FIG. 2, with the innermost end 40 being open and the outermost end 45 being connected to a matching network (matching network 15A, 15B, 15C, 15D shown in FIG. 1) as described below. In this manner, the square spiral antenna 35 may be viewed as an asymmetric dipole, and thus the square spiral antenna 35 does not need a ground plane. Preferably, the length of the outermost segment 50 of the square spiral antenna 35 is about equal to a quarter of the wavelength of the particular RF frequency or center frequency of the band of RF frequencies to which it is tuned as described herein, and the total length of the square spiral antenna 35 (three segments) is about equal to one half of that wavelength.

Figure 3:
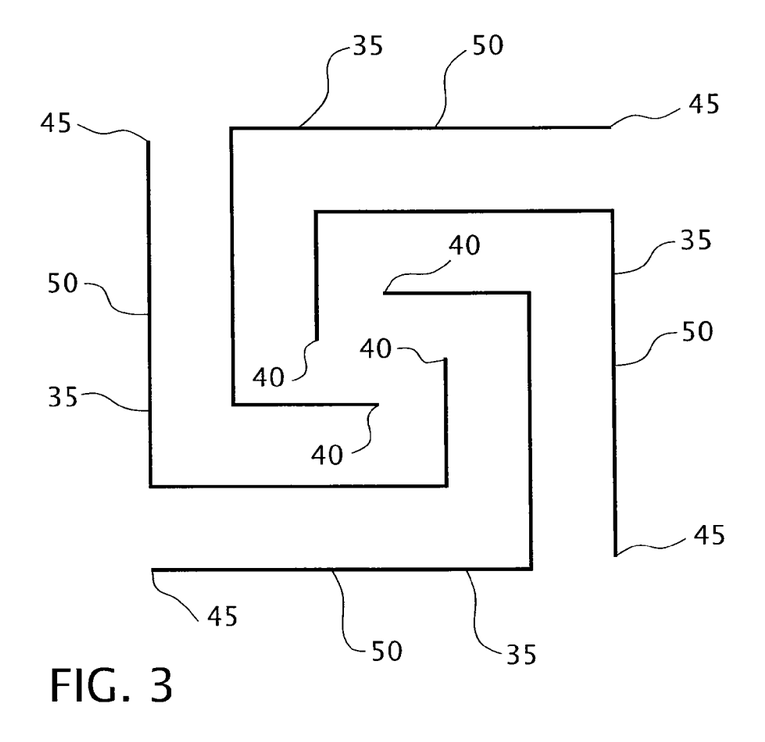
FIG. 3 is a schematic illustration of an embodiment of an antenna layout that may be used in the energy harvesting circuits described herein.

FIG. 3 is a schematic illustration of one particular antenna layout that may be used in the energy harvesting circuit 5 shown in FIG. 1 that includes four antennas 35 positioned and spaced in the manner shown with the outermost end 45 of each antenna 35 being connected to the respective matching network 15A, 15B, 15C, 15D as described below. It has been observed that the conductor width and spacing of the antennas 35 in FIG. 3 can be varied without seriously degrading the performance measured as the DC output of the respective charge pumps 20A, 20B, 20C, 20D described below. Therefore, in the layout shown in FIG. 3, it is possible to put four antennas 35 in an area that is slightly more than two times the area occupied by single antenna 35.

Referring again to FIG. 1, each antenna 10A, 10B, 10C, 10D is operatively coupled to a respective matching network 15A, 15B, 15C, 15D and charge pump 20A, 20B, 20C, 20D as shown in FIG. 1. In particular, each antenna 10A, 10B, 10C, 10D is electrically connected to a respective matching network 15A, 15B, 15C, 15D, which in turn is electrically connected to a respective voltage boosting and rectifying circuit preferably in the form of a one or more stage charge pump 20A, 20B, 20C, 20D. Charge pumps are well known in the art. Basically, one stage of a charge pump essentially doubles the effective amplitude of an AC input voltage and stores the resulting increased DC voltage on an output capacitor. The voltage could also be stored using a rechargeable battery. Successive stages of a charge pump, if present, will essentially increase the voltage from the previous stage resulting in an increased output voltage. In operation, each antenna 10A, 10B, 10C, 10D receives energy, such as RF energy, that is transmitted in space by a far-field source, such as an RF source. The RF source may be, for example, an RF interrogator unit which transmits an RF interrogation signal, or a local radio station, in which case the RF energy comprises ambient RF energy in the vicinity of the energy harvesting circuit 5. The RF energy received by each antenna 10A, 10B, 10C, 10D is provided, in the form of an AC signal, to the associated charge pump 20A, 20B, 20C, 20D through the associated matching network 15A, 15B, 15C, 15D. Each charge pump 20A, 20B, 20C, 20D rectifies the received AC signal to produce a respective DC signal 25A, 25B, 25C, 25D, wherein each DC signal 25A, 25B, 25C, 25D is amplified as compared to what it would have been had a simple rectifier been used. The individual DC signals 25A, 25B, 25C, 25D are then summed to produce a combined DC signal 30, which may be used to power a circuit or charge a power storage device as described elsewhere herein. The individual DC signals 25A, 25B, 25C, 25D may be summed in any suitable manner, such as, without limitation, connecting them in parallel or connecting them in series to produce the combined DC signal 30.

In one particular embodiment, each matching network 15A, 15B, 15C, 15D is chosen (i.e., its impedance is chosen) so as to maximize the output of the respective charge pump 20A, 20B, 20C, 20D in the form of the respective DC signal 25A, 25B, 25C, 25D (i.e., to maximize the DC signal 25A, 25B, 25C, 25D). In other words, each matching network 15A, 15B, 15C, 15D is matching the impedance of the respective antenna 10A, 10B, 10C, 10D to the respective charge pump 20A, 20B, 20C, 20D solely on the basis of maximizing the DC output of the respective charge pump 20A, 20B, 20C, 20D. In the preferred embodiment, each matching network 15A, 15B, 15C, 15D is an LC circuit of either an L topology (which includes one inductor and one capacitor) or a π topology (which includes one inductor and two capacitors) wherein the inductance of the LC circuit and the capacitance of the LC circuit are chosen so as to maximize the DC output of the respective charge pump 20A, 20B, 20C, 20D. In one embodiment, an LC tank circuit may be formed by the inherent distributed inductance and inherent distributed capacitance of the conducing elements of each antenna 10A, 10B, 10C, 10D, in which case the antenna is designed and laid out in a manner that results in the appropriate chosen L and C values.

Figure 4:
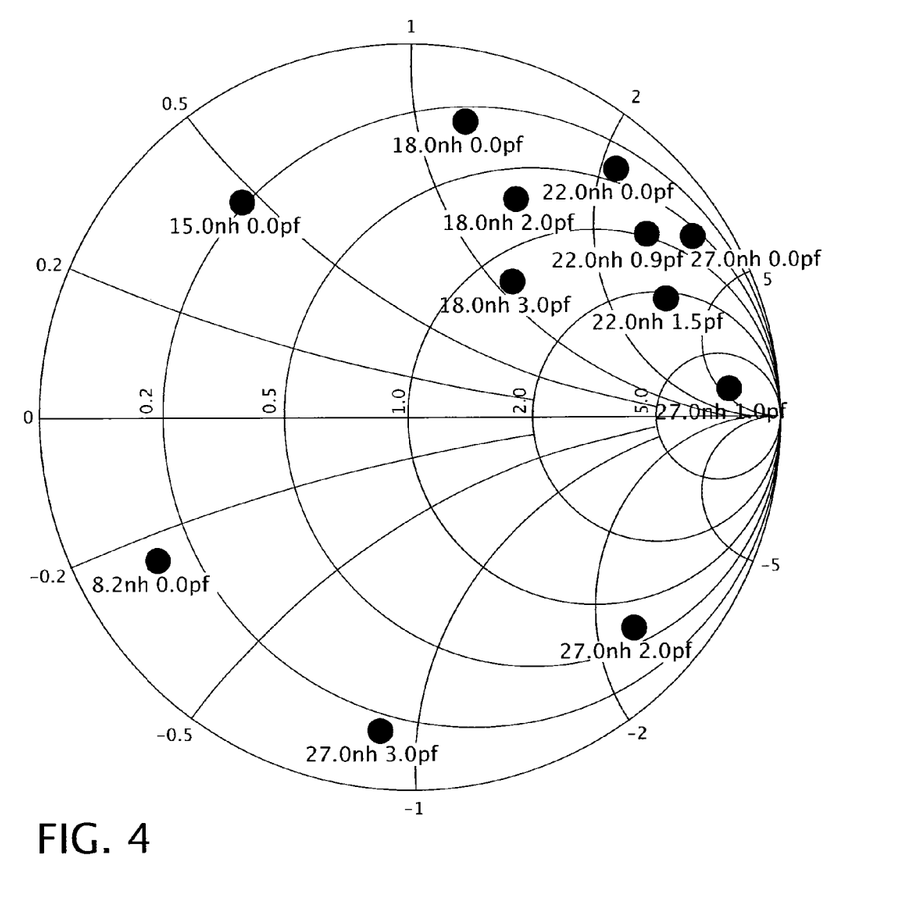
FIG. 4 is a Smith chart that may be employed to choose the matching networks as described herein.

In the preferred embodiment, each matching network 15A, 15B, 15C, 15D is chosen so as to maximize the output of the respective charge pump 20A, 20B, 20C, 20D using a trial and error ("annealing") empirical approach. In particular, various sets of inductor and capacitor values are used as matching elements in each matching network 15A, 15B, 15C, 15D, and the resulting output of the respective charge pump 20A, 20B, 20C, 20D is measured for each combination, and the combination that produces the maximum output is chosen. In this process, the input impedance of the charge pump (20A, 20B, 20C, 20D) with each matching network (15A, 15B, 15C, 15D) may be plotted as a point on a Smith chart with a color coding for the amount of energy harvested as shown in FIG. 4. After a number of tries, it is easy to see a clustering of the color coded points to selectively choose other points in or around the cluster to achieve a near optimum value. FIG. 4 illustrates a number of points showing the results on a Smith chart. It is important to note that the matching achieved in this manner tends to optimize the asymmetric dipole configuration described elsewhere herein. The matching component values are indicated in FIG. 4 as circles on the Smith chart with grayscale indications of voltage at the charge pump (20A, 20B, 20C, 20D) output as compared to the 0 to 5 volt grayscale on the right of FIG. 4.

In this embodiment, the matching network (15A, 15B, 15C, 15D) is chosen individually for each antenna (10A, 10B, 10C, 10D) in the energy harvesting circuit 5 in the manner just described. Other embodiments are also possible and are described below.

Figure 5:
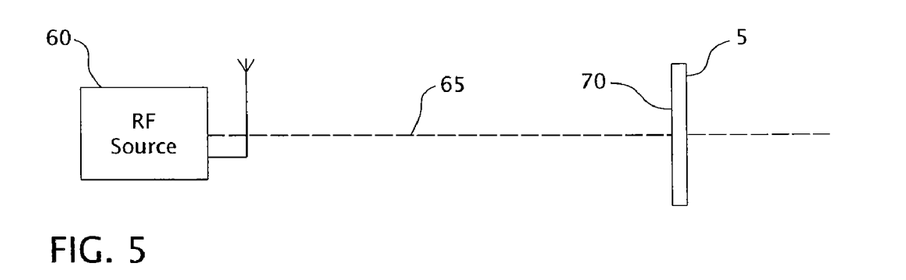
FIG. 5 is a schematic illustration of an energy harvesting circuit as described herein positioned within the range of a suitable RF source.

As will be appreciated by those of skill in the art, each antenna 10A, 10B, 10C, 10D that is included in the energy harvesting circuit 5, for example as laid out in FIG. 3, will have a different polarization with respect to the transmitting antenna of the RF source that is determined by the relative angle of the antenna 10A, 10B, 10C, 10D in question to the polarization of the transmitting antenna of the RF source. Another embodiment of the invention, described below, chooses each matching network (15A, 15B, 15C, 15D) in a manner whereby the relative polarization efficiency of each antenna 10A, 10B, 10C, 10D will be more efficiently utilized. In particular, in this embodiment, the energy harvesting circuit 5 is set up as shown in FIG. 1 with the antennas 10A, 10B, 10C, 10D being laid out as desired, for example in the manner shown in FIG. 3. Then, as shown in FIG. 5, the energy harvesting circuit 5 is positioned within the range of a suitable RF source 60, preferably of a type identical or similar to the one with which the energy harvesting circuit 5 will ultimately be used, with the plane 70 in which the antennas are laid out 10A, 10B, 10C, 10D being substantially perpendicular to a line 65 that is taken through the center of the transmitting antenna of the RF source 60. While the RF source 60 is transmitting, the antenna is incrementally rotated about the line 65, preferably through 360 degrees (the rotation will be into and out of the paper in FIG. 5). At each increment (each angle of rotation θ), the matching elements (the inductance and capacitance values) in each matching network 15A, 15B, 15C, 15D are varied over a set of different values (preferably predetermined), and with each such variation, the voltage level of the combined DC signal 30 is measured and recorded. The same set of inductance and capacitance values is used at each angle θ. In addition, at each angle θ, the set of values may and preferably will include instances where the values are different for one or more of the matching networks, i.e., each matching network will not have the same values. Once the rotation is complete, the measured and recorded levels of the combined DC signal 30 (as a function of the angle θ) are analyzed and the set of inductance and capacitance values yielding the minimum deviation in the combined DC signal 30 as a function of the angle θ is chosen. The matching networks 15A, 15B, 15C, 15D are then structured accordingly (i.e., to have the chosen inductance and capacitance values) in the final energy harvesting circuit 5. As will be appreciated, this will result in the combined DC signal 30 having the minimum deviation in all orientations of the energy harvesting circuit 5 in the plane in which the antennas are laid out. As a result, at least some minimum amount of DC voltage will be able to be harvested in all orientations of the energy harvesting circuit 5. This may be important if, for example, the circuit or object (or some component thereof) to be powered requires some minimum voltage level to operate. The matching networks 15A, 15B, 15C, 15D can be chosen as described above to ensure that at least that minimum voltage level is produced in all orientations (i.e., all angles of rotation θ) of the energy harvesting circuit 5. In addition, once the matching networks 15A, 15B, 15C, 15D (i.e., the inductance and capacitance values therefor) are chosen in this manner (which may be time consuming) for one energy harvesting circuit 5, multiple energy harvesting circuits 5 that meet the same parameters can be mass produced without having to go through the same trial and error steps.

In another embodiment, once the rotation is complete, the measured and recorded levels of the combined DC signal 30 are analyzed and the set of inductance and capacitance values yielding a maximum level for the combined DC signal 30 at any one orientation is chosen. The matching networks are then structured accordingly (i.e., to have the chosen inductance and capacitance values) in the final energy harvesting circuit 5.

In the energy harvesting circuit 5 shown in FIG. 1, it will be appreciated that each of the AC signals provided to the matching networks 15A, 15B, 15C, 15D will be in phase with one another. As a result, the individual antenna, matching, charge pump, etc. circuits have an RF supply in which the individual RF sinusoidal signals are in phase. This is analogous to the single phase rectifier design which is well known in DC rectifier circuitry. The removal of the minimum values of DC output is strictly on the basis of the angular variation of the antenna circuitry through matching the angles of orientation, and not the angles of the individual sinusoidal sources. Thus, in the energy harvesting circuit 5 shown in FIG. 1 the signals are not combined in the most efficient manner, and a more efficient manner is described below in connection with FIG. 6.

Figure 6:
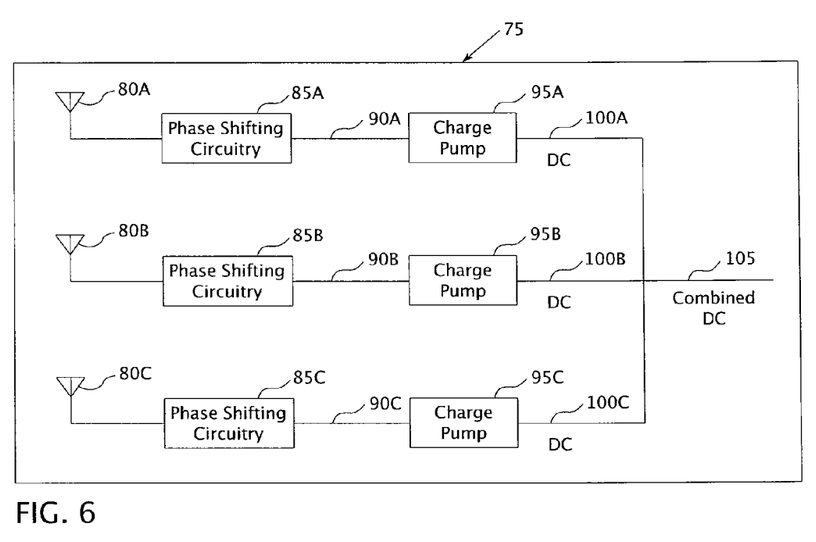
FIG. 6 is a block diagram of an energy harvesting circuit according to alternative embodiment of the invention in which a phase shift is introduced into each of the received RF signals.

FIG. 6 is a block diagram of an energy harvesting circuit 75 according to alternative embodiment of the invention in which a phase shift is introduced into each of the received RF signals. In particular, the energy harvesting circuit 75 includes a plurality of antennas 80A-80C (similar to the antennas 10A-10D), each of which is fixedly tuned to the same particular RF range. While three antennas 80A-80C are shown in FIG. 6, it should be understood that that is meant to be exemplary only, and that the plurality of antennas may include less than or more than three antennas (with each such antenna being operatively coupled to respective accompanying circuitry as described below). Furthermore, each antenna 80A, 80B, 80C may be, for example, a square spiral antenna 35 having the form shown in FIG. 2. In the case of four antennas, the layout may be as shown in FIG. 3.

As shown in FIG. 6, each antenna 80A, 80B, 80C is electrically connected to respective phase shifting circuitry 85A, 85B, 85C, which in turn is electrically connected to a respective voltage boosting and rectifying circuit preferably in the form of a one or more stage charge pump 95A, 95B, 95C. In operation, each antenna 80A, 80B, 80C receives energy, such as RF energy, that is transmitted in space by a far-field source, such as an RF source. The RF source may be, for example, an RF interrogator unit which transmits an RF interrogation signal, or a local radio station, in which case the RF energy comprises ambient RF energy in the vicinity of the energy harvesting circuit 75. The RF energy received by each antenna 80A, 80B, 80C is provided, in the form of an AC signal, to the associated phase shifting circuitry 85A, 85B, 85C. Each phase shifting circuitry 85A, 85B, 85C shifts the phase of the received AC signal in a manner such that the AC signals 90A, 90B, 90C output by the phase shifting circuitry 85A, 85B, 85C are all out of phase with one another. Thus, each phase shifting circuitry 85A, 85B, 85C introduces a different degree of phase shift (which may actually be zero, in which case that particular phase shifting circuitry may be omitted, or, alternatively, be arranged to simply not shift phase or shift phase by 360 degrees). In one embodiment, the phase shift introduced by each phase shifting circuitry 85A, 85B, 85C results in each AC signal 90A, 90B, 90C being out of phase from the immediately adjacent signal AC signal 90A, 90B, 90C by an equal amount. For example, for three AC signals 90A, 90B, 90C, there would be 120 degrees separating immediately adjacent signals (e.g., one with 0 degrees phase shift, one with 120 degrees phase shift and one with 240 degrees phase shift, or, alternatively, one with 20 degrees phase shift, one with 140 degrees phase shift and one with 260 degrees phase shift).

The AC signal AC signal 90A, 90B, 90C output by each phase shifting circuitry 85A, 85B, 85C is provided to the associated charge pump 95A, 95B, 95C. In an alternative embodiment, the AC signal AC signal 90A, 90B, 90C output by each phase shifting circuitry 85A, 85B, 85C may be provided to the associated charge pump 95A, 95B, 95C through an associated matching network chosen and configured in the manners described elsewhere herein in order to optimize DC output. In either embodiment, each charge pump 95A, 95B, 95C amplifies and rectifies the received AC signal to produce a respective DC signal 100A, 100B, 100C. The individual DC signals 100A, 100B, 100C are then summed (as described elsewhere herein) to produce a combined DC signal 105, which may be used to power a circuit or charge a power storage device as described elsewhere herein. Because the AC signal 90A, 90B, 90C received by the charge pumps 95A, 95B, 95C are all out of phase with one another, they are able to be converted to DC and summed to produce the combined DC signal 105 in a more efficient manner, thereby leading to an increase on the voltage of the combined DC signal 105 over what would have been the case had the phase shifts described herein not been introduced. This is the case because the phase shifts cause the peaks and valleys of the AC signals 90A, 90B, 90C be offset form one another rather then lined up with one another. It will also be appreciated that the multiphase embodiment provides a second degree of freedom in design for rotational purposes.

Figure 7:
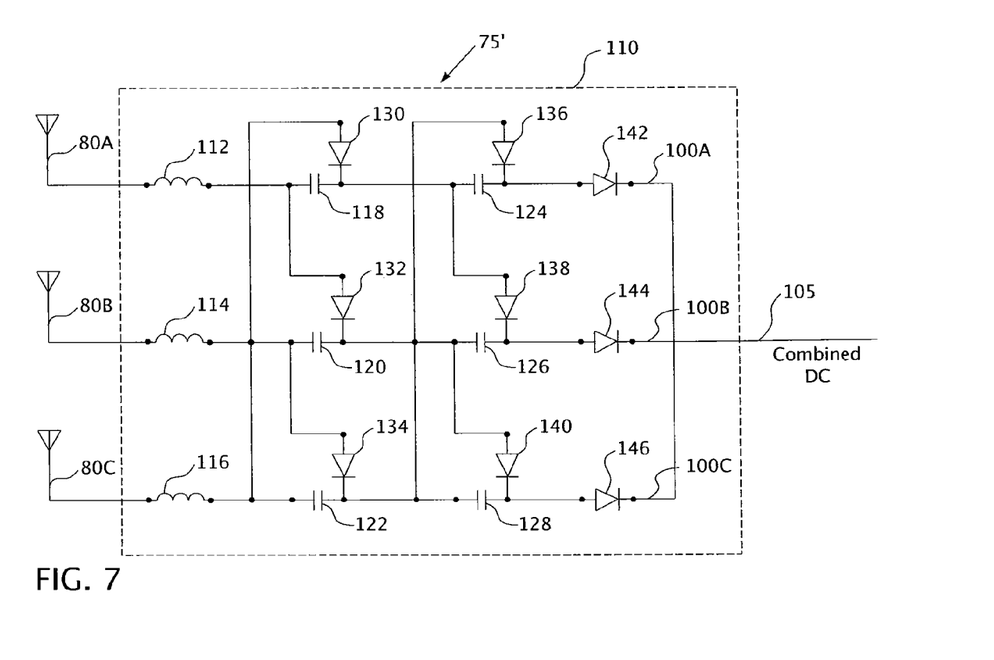
FIGS. 7, 8 and 9 are schematic illustrations of three particular embodiments of the energy harvesting circuit shown in FIG. 6.
Figure 8:
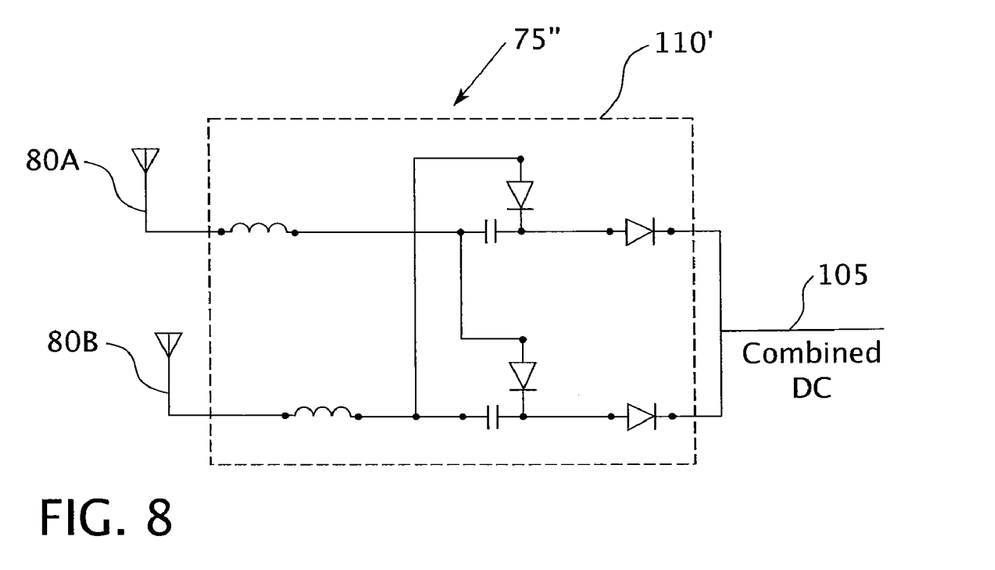
Figure 9:
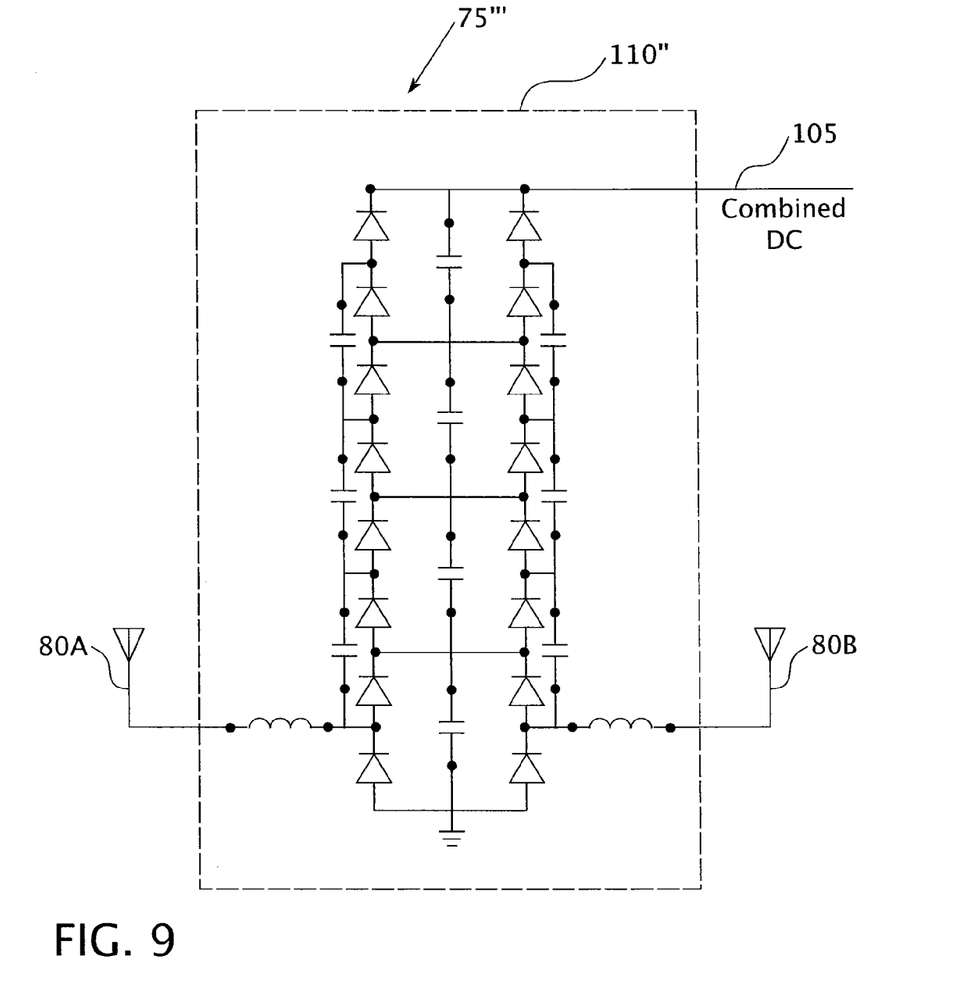

FIG. 7 is schematic illustration of one particular embodiment of the energy harvesting circuit 75, labeled as 75'. The energy harvesting circuit 75' includes antennas 80A, 80B, 80C as described above, each of which is fixedly tuned to the same particular RF frequency range and outputs an AC signal. Each antenna 80A, 80B, 80C is connected to phase shifting and rectifying circuitry 110 that performs the functionality of the phase shifting circuitry 85A, 85B, 85C and the charge pumps 95A, 95B, 95C to produce the respective DC signals 100A, 100B, 100C As described elsewhere herein, the DC signals 100A, 100B, 100C are then summed (as described elsewhere herein) to produce a combined DC signal 105. The phase shifting and rectifying circuitry 110 includes a well known Cockroft-Walton multiplier and consists of inductors 112, 114, and 116, capacitors 118, 120, 122, 124, 126, and 128, and diodes 130, 132, 134, 1365, 138, 140, 142, 144 and 146 connected as shown in FIG. 7. The phase shifting and rectifying circuitry 110 receives each AC signal from the antennas 80A, 80B, 80C, shifts the phases thereof such that each AC signal is out of phase with one another, and boosts and rectifies the resulting signals to produce the DC signals 100A, 100B, 100C. The values of the inductors 112, 114, and 116 and the capacitors 118, 120, and 122 determines the degree of phase shift applies to each respective AC signal received from the antennas 80A, 80B, 80C. FIG. 8 shows a similar embodiment of an energy harvesting circuit 75" where two antennas are used with similar phase shifting and rectifying circuitry 110'. It will be appreciated that four or more antennas may be used in a similar manner. FIG. 9 shows yet another similar embodiment of an energy harvesting circuit 75''' where two antennas are used with similar phase shifting and rectifying circuitry 110".

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. An energy harvesting circuit, comprising:
   a plurality of antennas, each of said antennas being fixedly tuned to the same particular RF frequency range, each of said antennas being structured to receive an RF signal having said particular RF frequency range and output a respective AC signal;

a plurality of matching networks, each of said matching networks being operatively coupled to a respective one of said antennas and being structured to receive the AC signal output by said respective one of said antennas; and a plurality of voltage boosting and rectifying circuits, each of said voltage boosting and rectifying circuits being operatively coupled to a respective one of said matching networks and being structured to receive the AC signal received by the respective one of said matching networks and output a DC voltage signal by converting the received AC signal into the DC voltage signal;

wherein the DC voltage signals output by the voltage boosting and rectifying circuits are summed together to create a combined DC voltage signal, and wherein an impedance of each of the matching networks is chosen in manner so as to maximize a voltage level of the DC voltage signal that is output by the associated one of the voltage boosting and rectifying circuits.

2. The energy harvesting circuit according to claim 1, wherein each of said voltage boosting and rectifying circuits is a charge pump.

3. The energy harvesting circuit according to claim 1, wherein each of said matching networks is an LC tank circuit.

4. The energy harvesting circuit according to claim 3, wherein an impedance of each of the matching networks is chosen in manner so as to maximize a voltage level of the DC voltage signal that is output by the associated one of the voltage boosting and rectifying circuits by, for each LC tank circuit of each of the matching networks: (i) trying a plurality of different inductance and capacitance value combinations for the LC tank circuit, (ii) measuring the voltage level of the DC voltage signal that is output by the associated one of the voltage boosting and rectifying circuits for each of the inductance and capacitance value combinations, and (iii) choosing one of the inductance and capacitance value combinations that produces a maximum voltage level of the DC voltage signal that is output by the associated one of the voltage boosting and rectifying circuits.

5. The energy harvesting circuit according to claim 1, wherein each of said antennas is a square spiral antenna having an outermost segment, a middle segment and an innermost segment, wherein a length of each outermost segment of is equal to about a quarter of the wavelength of the particular RF frequency or center frequency of the band of RF frequencies included in said particular RF frequency range, wherein a total length of each square spiral antenna is equal to about one half of said wavelength, and wherein the outermost segment of each of said antennas is operatively coupled to the associated one of said matching networks.

6. The energy harvesting circuit according to claim 5, wherein each square spiral antenna alone occupies a first spatial area, and wherein said antennas are provided in an antenna layout that occupies a second spatial area that is less than two times said first spatial area.

7. An energy harvesting method, comprising:
providing a plurality of antennas, each of said antennas being fixedly tuned to the same particular RF frequency range;
receiving a plurality of RF signals using said antennas, each of said RF signals having said particular RF frequency range;
outputting from said antennas a plurality of AC signals in response to receiving said RF signals;
converting each of the AC signals into a respective DC voltage signal after first passing each of the AC signals through a respective matching network having an impedance chosen in manner so as to maximize a voltage level of the respective DC voltage signal; and
summing each of the respective DC voltage signals together to create a combined DC voltage signal.

8. An energy harvesting circuit, comprising:
a plurality of antennas provided in an antenna plane, each of said antennas being tuned to the same particular RF frequency range, each of said antennas being structured to receive an RF signal having said particular RF frequency range and output a respective AC signal;
a plurality of matching networks, each of said matching networks being operatively coupled to a respective one of said antennas and being structured to receive the AC signal output by said respective one of said antennas; and
a plurality of voltage boosting and rectifying circuits, each of said voltage boosting and rectifying circuits being operatively coupled to a respective one of said matching networks and being structured to receive the AC signal received by the respective one of said matching networks and output a DC voltage signal by converting the received AC signal into the DC voltage signal;
wherein the DC voltage signals output by the voltage boosting and rectifying circuits are summed together to create a combined DC voltage signal, and wherein an impedance of each of the matching networks is chosen so as to cause a voltage level of the combined DC voltage signal to have a minimum deviation as a function of angle of rotation as said antenna plane is rotated about a first axis.

9. The energy harvesting circuit according to claim 8, wherein said first axis is a line taken through a center of a transmitting antenna of a source of said RF signal having said particular RF frequency range.

10. The energy harvesting circuit according to claim 8, wherein each of said voltage boosting and rectifying circuits is a charge pump.

11. The energy harvesting circuit according to claim 8, wherein each of said matching networks is an LC tank circuit.

12. The energy harvesting circuit according to claim 11, wherein an impedance of each of the matching networks is chosen so as to cause a voltage level of the combined DC voltage signal to have a minimum deviation as a function of angle of rotation as said antenna plane is rotated about a first axis by: (i) incrementally rotating said antenna plane through a plurality of angle increments, (ii) trying a plurality of different inductance and capacitance value combinations for each LC tank circuit of each of the matching networks at each of said angle increments, (iii) measuring the combined DC voltage signal for each of the inductance and capacitance value combinations at each of said angle increments, (iv) determining which one of the inductance and capacitance value combinations produces a minimum deviation in said measured combined DC voltage signals as a function of each of said angle increments; (v) choosing for each said LC tank circuit the one of the inductance and capacitance value combinations that produces the minimum deviation.

13. The energy harvesting circuit according to claim 8, wherein each of said antennas is a square spiral antenna having an outermost segment, a middle segment and an innermost segment, wherein a length of each outermost segment of is equal to about a quarter of the wavelength of the particular RF frequency or center frequency of the band of RF frequencies included in said particular RF frequency range, wherein a total length of each square spiral antenna is equal to about one half of said wavelength, and wherein the outermost segment of each of said antennas is operatively coupled to the associated one of said matching networks.

14. The energy harvesting circuit according to claim 13, wherein each square spiral antenna alone occupies a first spatial area, and wherein said antennas are provided in an antenna layout that occupies a second spatial area that is less than two times said first spatial area.

15. An energy harvesting method, comprising:
providing a plurality of antennas in an antenna plane, each of said antennas being tuned to the same particular RF frequency range;
receiving a plurality of RF signals using said antennas, each of said RF signals having said particular RF frequency range;
outputting from said antennas a plurality of AC signals in response to receiving said RF signals;
converting each of the AC signals into a respective DC voltage signal; and
summing each of the respective DC voltage signals together to create a combined DC voltage signal;
wherein said converting step is performed after first passing each of the AC signals through a respective matching network having an impedance chosen so as to cause a voltage level of the combined DC voltage signal to have a minimum deviation as a function of angle of rotation as said antenna plane is rotated about a first axis.

16. The energy harvesting method according to claim 15, wherein said first axis is a line taken through a center of a transmitting antenna of a source of each said RF signal having said particular RF frequency range.

17. An energy harvesting circuit, comprising:
a plurality of antennas provided in an antenna plane, each of said antennas being tuned to the same particular RF frequency range, each of said antennas being structured to receive an RF signal having said particular RF frequency range and output a respective AC signal;
a plurality of matching networks, each of said matching networks being operatively coupled to a respective one of said antennas and being structured to receive the AC signal output by said respective one of said antennas; and
a plurality of voltage boosting and rectifying circuits, each of said voltage boosting and rectifying circuits being operatively coupled to a respective one of said matching networks and being structured to receive the AC signal received by the respective one of said matching networks and output a DC voltage signal by converting the received AC signal into the DC voltage signal;
wherein the DC voltage signals output by the voltage boosting and rectifying circuits are summed together to create a combined DC voltage signal, and wherein an impedance of each of the matching networks is chosen so as to cause a voltage level of the combined DC voltage signal to have at least a predetermined minimum value as said antenna plane is rotated about a first axis.

18. The energy harvesting circuit according to claim 17, wherein said first axis is a line taken through a center of a transmitting antenna of a source of said RF signal having said particular RF frequency range.

19. The energy harvesting circuit according to claim 17, wherein each of said voltage boosting and rectifying circuits is a charge pump.

20. The energy harvesting circuit according to claim 17, wherein each of said matching networks is an LC tank circuit.

21. The energy harvesting circuit according to claim 20, wherein an impedance of each of the matching networks is chosen so as to cause a voltage level of the combined DC voltage signal to have at least a predetermined minimum value as said antenna plane is rotated about a first axis by: (i) incrementally rotating said antenna plane through a plurality of angle increments, (ii) trying a plurality of different inductance and capacitance value combinations for each LC tank circuit of each of the matching networks at each of said angle increments, (iii) measuring the combined DC voltage signal for each of the inductance and capacitance value combinations at each of said angle increments, (iv) determining which one of the inductance and capacitance value combinations produces at least said predetermined minimum value at each of said angle increments; (v) choosing for each said LC tank circuit the one of the inductance and capacitance value combinations that produces the at least said predetermined minimum value.

22. The energy harvesting circuit according to claim 17, wherein each of said antennas is a square spiral antenna having an outermost segment, a middle segment and an innermost segment, wherein a length of each outermost segment of is equal to about a quarter of the wavelength of the particular RF frequency or center frequency of the band of RF frequencies included in said particular RF frequency range, wherein a total length of each square spiral antenna is equal to about one half of said wavelength, and wherein the outermost segment of each of said antennas is operatively coupled to the associated one of said matching networks.

23. The energy harvesting circuit according to claim 22, wherein each square spiral antenna alone occupies a first spatial area, and wherein said antennas are provided in an antenna layout that occupies a second spatial area that is less than two times said first spatial area.

24. An energy harvesting method, comprising:
providing a plurality of antennas in an antenna plane, each of said antennas being tuned to the same particular RF frequency range;
receiving a plurality of RF signals using said antennas, each of said RF signals having said particular RF frequency range;
outputting from said antennas a plurality of AC signals in response to receiving said RF signals;
converting each of the AC signals into a respective DC voltage signal; and
summing each of the respective DC voltage signals together to create a combined DC voltage signal;
wherein said converting step is performed after first passing each of the AC signals through a respective matching network having an impedance chosen so as to cause a voltage level of the combined DC voltage signal to have at least a predetermined minimum value as said antenna plane is rotated about a first axis.

25. The energy harvesting method according to claim 24, wherein said first axis is a line taken through a center of a transmitting antenna of a source of each said RF signal having said particular RF frequency range.

26. An energy harvesting circuit, comprising:
a plurality of antennas provided in an antenna plane, each of said antennas being tuned to the same particular RF frequency range, each of said antennas being structured to receive an RF signal having said particular RF frequency range and output a respective AC signal;
a plurality of matching networks, each of said matching networks being operatively coupled to a respective one of said antennas and being structured to receive the AC signal output by said respective one of said antennas; and
a plurality of voltage boosting and rectifying circuits, each of said voltage boosting and rectifying circuits being operatively coupled to a respective one of said matching networks and being structured to receive the AC signal received by the respective one of said matching networks and output a DC voltage signal by converting the received AC signal into the DC voltage signal;

wherein the DC voltage signals output by the voltage boosting and rectifying circuits are summed together to create a combined DC voltage signal, and wherein an impedance of each of the matching networks is chosen by: (i) incrementally rotating said antenna plane through a plurality of angle increments about a first axis, (ii) trying a plurality of different inductance and capacitance value combinations for each LC tank circuit of each of the matching networks at each of said angle increments, (iii) measuring the combined DC voltage signal for each of the inductance and capacitance value combinations at each of said angle increments, (iv) determining which one of the inductance and capacitance value combinations produces a maximum voltage level for said measured combined DC voltage signals at any one of said angle increments; (v) choosing for each said LC tank circuit the one of the inductance and capacitance value combinations that produces the maximum voltage level.

27. An energy harvesting circuit, comprising:

a plurality of antennas, each of said antennas being tuned to the same particular RF frequency range, each of said antennas being structured to receive an RF signal having said particular RF frequency range and output a respective AC signal; and phase shifting and rectifying circuitry operatively coupled to said antennas, said phase shifting and rectifying circuitry being structured to: (i) receive each said respective AC signal, (ii) create a plurality of out of phase AC signals by causing each said respective AC signal to be out of phase with one another, and (iii) convert each of said out of phase AC signals into a respective DC voltage signal;

wherein the DC voltage signals are summed together to create a combined DC voltage signal.

28. The energy harvesting circuit according to claim 27, wherein said phase shifting and rectifying circuitry comprises: (i) a plurality of phase shifting circuits, each of said phase shifting circuits being operatively coupled to a respective one of said antennas and creating a respective one of said out of phase AC signals, and (ii) a plurality of voltage boosting and rectifying circuits, each of said voltage boosting and rectifying circuits being operatively coupled to a respective one of said phase shifting circuits and converting a respective one of said of said out of phase AC signals into the respective DC voltage signal.

29. The energy harvesting circuit according to claim 28, wherein each of said voltage boosting and rectifying circuits is a charge pump.

30. The energy harvesting circuit according to claim 27, wherein a phase shift between each of said out of phase AC signals and each one of said out of phase AC signals that is adjacent in phase thereto is equal to 360 degrees divided by a total number of said antennas.

31. The energy harvesting circuit according to claim 27, wherein said phase shifting and rectifying circuitry includes a Cockroft-Walton multiplier.

32. An energy harvesting method, comprising:

providing a plurality of antennas, each of said antennas being tuned to the same particular RF frequency range;

receiving a plurality of RF signals using said antennas, each of said RF signals having said particular RF frequency range;

outputting from said antennas a plurality of AC signals in response to receiving said RF signals;

creating a plurality of out of phase AC signals by causing each of said AC signals to be out of phase with one another;

converting each of said out of phase AC signals into a respective DC voltage signal; and summing each of the respective DC voltage signals together to create a combined DC voltage signal.

* * * * *

UNITED STATES PATENT AND TRADEMARK OFFICE
CERTIFICATE OF CORRECTION

PATENT NO. : 7,528,698 B2 Page 1 of 1
APPLICATION NO. : 11/619786
DATED : May 5, 2009
INVENTOR(S) : Marlin H. Mickle et al.

It is certified that error appears in the above-identified patent and that said Letters Patent is hereby corrected as shown below:

Column 5, line 29, "the conducing elements" should be --the conducting elements--.
Column 7, line 63, "AC signal AC signal" should be --AC signal--.
Column 8, line 16, "offset form one another" should be --offset from one another--.
Column 8, line 29, "100C As described" should be --100C. As described--.
Column 8, line 35, "130, 132, 134, 1365," should be --130, 132, 134, 136--.
Column 8, line 42, "determines" should be --determine--.
Column 8, line 43, "applies" should be --applied--.
Column 9, lines 43 claim 5, "outermost segment of is equal" should be --outermost segment is equal--.
Column 10, line 62 claim 13, "outermost segment of is equal" should be --outermost segment is equal--.
Column 12, line 19 claim 21, "outermost segment of is equal" should be --outermost segment is equal--.
Column 14, line 10 claim 28, "of said of said" should be --of said--.

Signed and Sealed this

Eleventh Day of August, 2009

David J. Kappos
*Director of the United States Patent and Trademark Office*